United States Patent [19]
Burwell

[11] 3,721,392
[45] March 20, 1973

[54] TIRE GRINDING FEED DEVICE
[75] Inventor: Stanley J. Burwell, Glen Arm, Md.
[73] Assignee: Lyons Industries, Inc., Pikesville, Md.
[22] Filed: March 1, 1971
[21] Appl. No.: 119,516

[52] U.S. Cl. ................241/301, 51/139, 241/200, 241/280
[51] Int. Cl. .......................................B02c 19/00
[58] Field of Search......241/277, 301, 280, 281, 200; 51/139; 100/95, 176; 146/117, 120

[56] References Cited

UNITED STATES PATENTS 969,100  8/1910  Gare.................................241/280 X
821,447  5/1906  Albrecht..........................241/280 X
2,934,279  4/1960  Nestor et al..........................241/200

Primary Examiner—Robert L. Spruill
Attorney—Lawrence J. Winter

[57] ABSTRACT

A tire grinding device comprising conveyor means for feeding a row of tires along a path of travel with converging feed roll means disposed adjacent one end of the conveyor means for squeezing a tire therebetween in a relatively flat configuration, and grinding means disposed adjacent one side of said feed roll means for pulverizing and grinding the tire as it is continuously fed between said feed roll means. The apparatus is provided with support means adjacent the lower portion of the feed roll means to support the edge of the tire as it is being pulverized by the grinding means.

5 Claims, 4 Drawing Figures

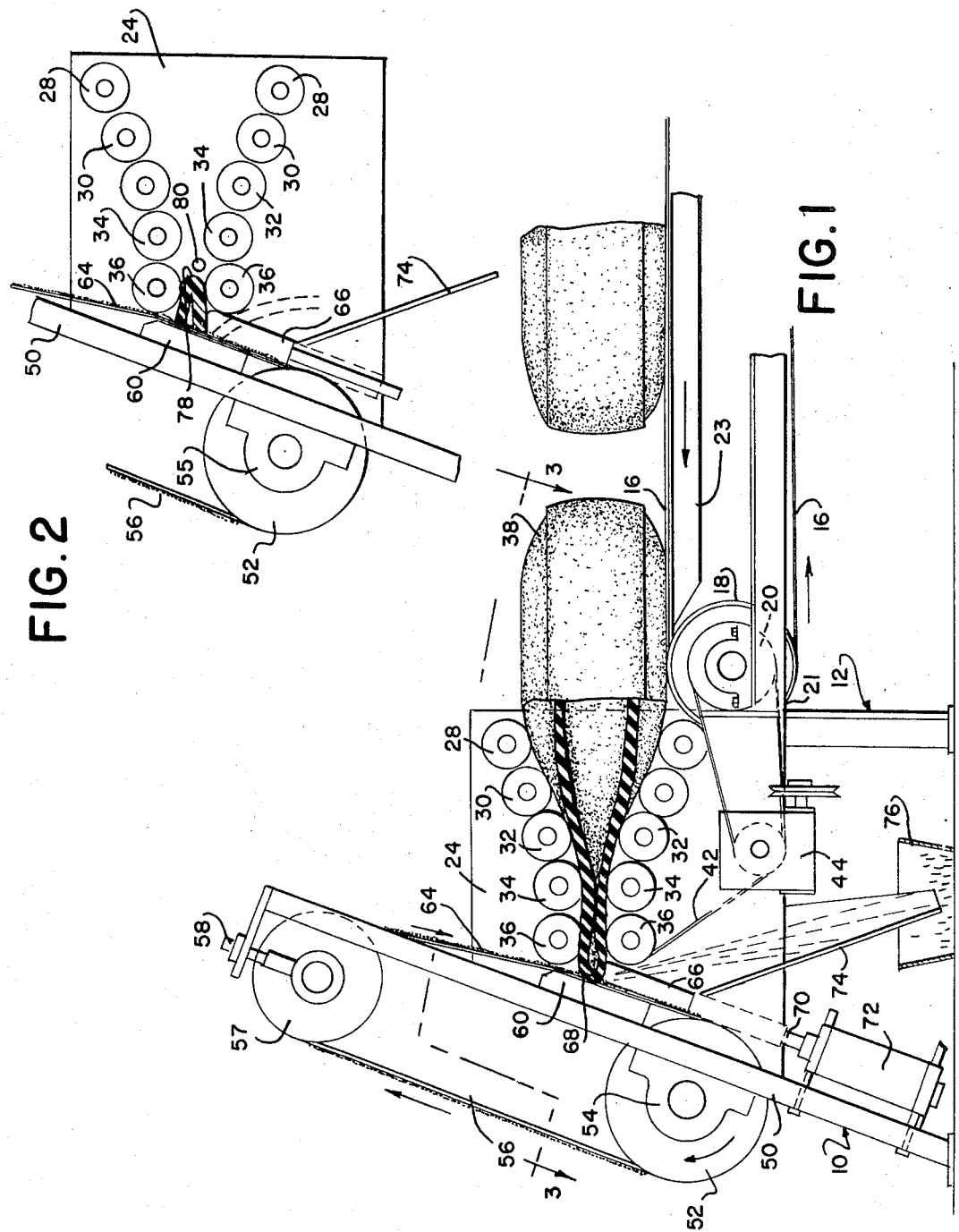

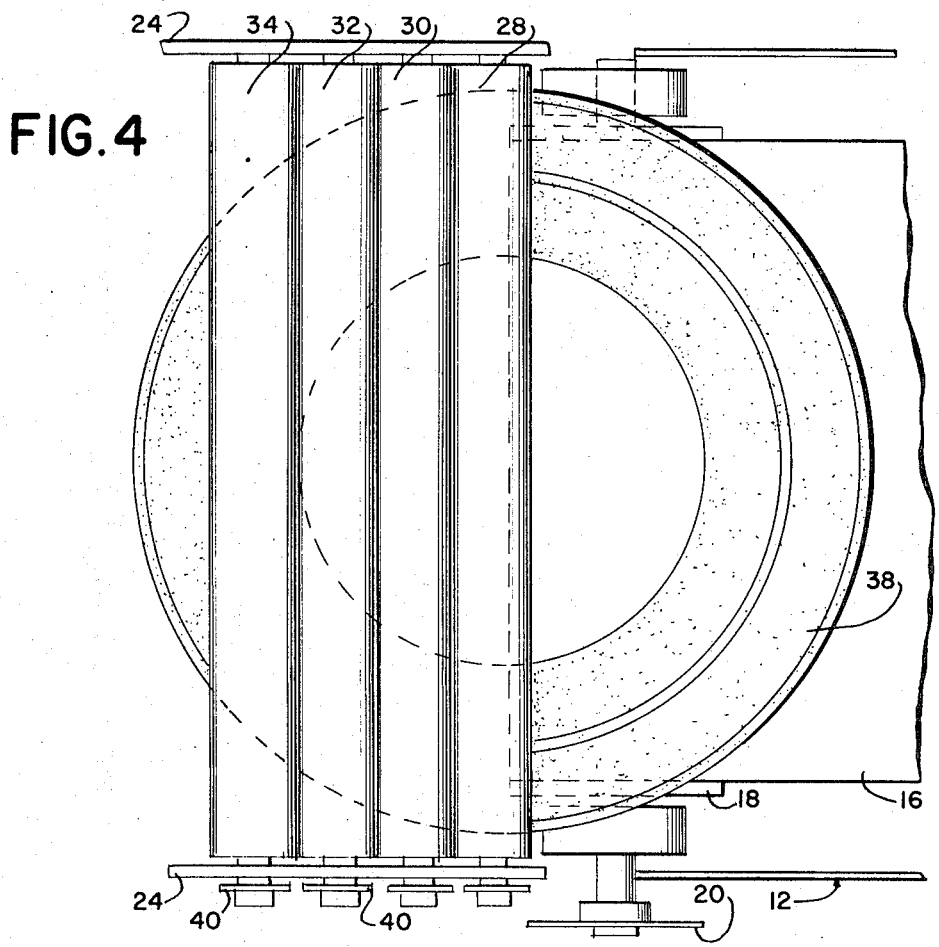
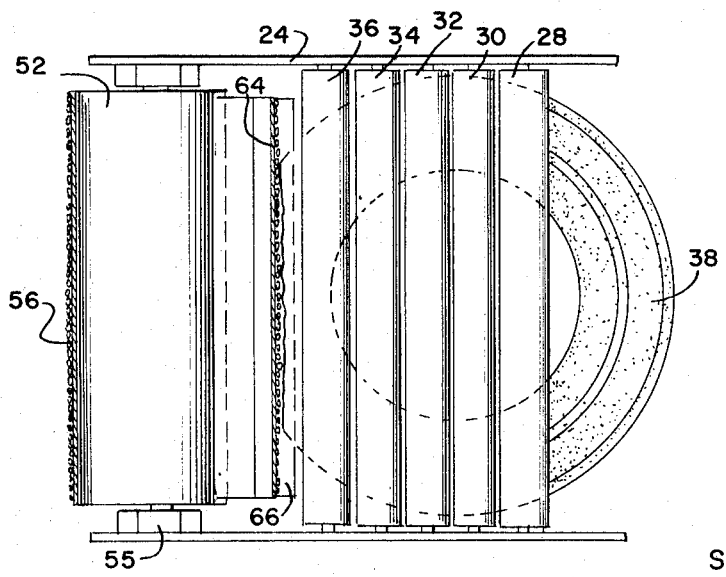

TIRE GRINDING FEED DEVICE

The present invention relates to a tire grinding apparatus for disposing of whole tires that are no longer serviceable by reducing the used tire to a pulverized powdered material.

It is an object of the present invention to provide a tire pulverizing apparatus for disposing of worn tires by reducing the tires to a rubber powder or rubber material which can be used in molded rubber products or other industrial uses.

It is yet another object of the present invention to provide a tire grinding machine which will reduce old automobile tires to rubber dust to facilitate their disposal as refuse and to provide a material useable as a filler in various molded rubber products, asphalt road surfacing material and other applicable uses.

Still another object of the present invention is to provide a tire grinding machine that can quickly reduce discarded and used tires into a powdered form without causing pollution of the atmosphere, which occurred heretofore when tires were burned.

Various other objects and advantages of the present invention will be readily apparent from the following detailed description when considered in connection with the accompanying drawings forming a part thereof and in which:

FIG. 1 is a side elevational view of the tire grinding apparatus,

FIG. 2 is a fragmentary detailed view illustrating the grinding of the rear portion or trailing edge of a tire when it has been reduced to pelt size;

FIG. 3 is an enlarged plan view of the feed roller portion of the grinding apparatus shown in FIG. 1, and FIG. 4 is a section taken along the lines 4—4 of FIG. 1.

Referring to the drawings, the reference numeral 10 generally designates the tire grinding apparatus or machine of the present invention and is provided with a frame 12 which may be made of angle irons or the like for supporting thereon an endless conveyor belt 16 which is carried by a front head roller 18 and a rear roller, not shown. The roller 18 is provided with a sprocket wheel 20 on its axle, as best seen in FIG. 4, for carrying an endless sprocket chain 21 thereon, which is conventionally driven by a motor, not shown. The upper portion of the belt 16 is provided with a flat support member 23 to keep the belt from sagging under the weight of the tires placed thereon.

Disposed adjacent the discharge end or grinding end of the conveyor are a pair of laterally spaced vertical plates or frames 24, as best seen in FIGS. 1 and 3. The frames or plates 24 are supported by the main frame structure 12 and have extending between them a plurality of horizontally extending squeeze or feed rolls 26. The rolls are disposed so that the two rolls 28 next adjacent to the discharge end of the conveyor are spaced a substantial vertical distance apart from one another, and each pair of successive rollers indicated as 30, 32, 34 and 36, are spaced closer together so as to form a bank of converging rolls in order to flatten or compress a tire 38 therebetween as the tire is fed off of the conveyor belt 16.

The rollers are provided with sprocket wheels 40 which carry an endless chain 42 for driving them, with the endless chain being operatively connected to a gear reduction mechanism 44 which, in turn, is driven by a motor, not shown. It is also to be noted that the endless conveyor belt 16 is also connected to gear reduction mechanism 44 by a chain 21 carried by the sprocket 20 of the head roller 18.

The grinding means include vertically inclined members or struts 50 laterally spaced from each other and carrying a horizontally or laterally extending pulley 52. The pulley is disposed on bearings 54 which are driven by a motor, not shown, and a conventional endless sprocket chain carried by a sprocket, not shown, disposed on the pulley axle. The pulley 52 is disposed adjacent the lower end of the grinder and carries an endless belt sander having an abrasive coating material thereon. The upper end of the belt sander 56 is disposed over an idler pulley 57 having threaded bolt means 58 for tensioning the belt as desired. The grinding apparatus may be provided with a platen 60 carried by the vertical members 50 or a cross member if desired for supporting the portion of the belt indicated at 64 so as to press against the belt sander at the point or portion against which the tire 38 bears during the grinding operation.

The grinding apparatus is also provided with a backup or support bar 66 which extends substantially the width of the rollers and the conveyor so as to support the leading edge 68 of the tire being ground. The support bar 66 is disposed between the last pair of rollers 36 and the platen 60 and is operatively connected to a piston rod 70 of a hydraulic ram 72.

The portion 68 of the tire being ground as the belt continuously rotates at fast speed has its powdered particles discharged down a chute 74 into a storage hopper 76 which may be connected to vacuum means, not shown, for removing the particles from the storage hopper 76.

In operation, the endless conveyor belt 16 is loaded with a plurality of tires and is continuously driven as are the power rollers 28–36 and the endless sander 54 is also driven at this time at a high speed so that the tires 38 will pass from the supply end of the apparatus to the discharge or grinding end. The power rollers 28–36, as best seen in FIG. 1, will squeeze and flatten the leading edge or portion 68 of the tire as it passes through the power rollers so that it moves into a position to begin to be ground by the belt sander.

Successive tires are brought in to the rollers and the portion 68 of the tire being ground is supported by the support bar 66 while the platen 60 supports the grinding portion 64 of the belt at this time. Grinding of the tire continues from the operation illustrated in FIG. 1 to the operation illustrated in FIG. 2 in which only the rear portion or pelt 78 of a tire remains, which portion or pelt can no longer be fed against the belt. It desired, the pelt 78 may be released down the chute 74 by lowering the support bar 66 or alternatively the apparatus may be provided with a conventional cutter.

Alternatively as grinding continues to the condition shown in FIG. 2 at which time the remaining pelt 78, or piece of tire, may no longer be fed against the belt, the apparatus may be provided with a photo-electric sensor, not shown, directs a light beam, through an orifice indicated at 80, across the path of the moving tire so as to activate a conventional photo-electric sensor, not shown, which through a conventional amplifier, relay and magnetic valve, not shown, are operatively connected to each other in a conventional and well known manner, cause air or oil to be directed to the hydraulic ram 72 which will then actuate its piston rod 70 so as to lower the support bar 66 to allow the remaining rubber pelt 78 to fall freely down the chute 74. These pelts do not get ground by the present machine but may be filtered by any well known conventional means from the ground portion of the tire.

The next successive tire 38, as it comes along the conveyor and has already been gripped by the power rollers, will cut off the light beam 80 from its orifice and return the piston rod and the cylinder to the position shown in FIG. 1 ready to support the tire as it is being ground. The cycle may then be repeated as long as the apparatus is in operation.

Thus, from the foregoing description, the present invention provides an apparatus which will reduce used and non-serviceable automobile tires, and other non-serviceable rubber products and the like to a rubber dust to facilitate their disposal and to provide a material that is useful as a filler in molded rubber products.

From the foregoing description it is also apparent that the present invention provides means for eliminating pollution in disposing of non-serviceable vehicle tires by the use of a powerful sanding belt which grinds the tires to dust so that the rubber may again be used in other products.

The present invention further provides a machine consisting of an endless belt sander running at high speed over pulley means and driven so as to progressively pulverize an automobile tire that is pressed against the belt by a plurality of converging power rollers.

Inasmuch as various changes may be made in the relative location and arrangement of the several parts without departing from the spirit and scope of the invention, it is not meant to limit the invention except by the following claims.

What is claimed is:

1. An apparatus for grinding tires and the like, comprising grinding means, means for feeding tires against said grinding means, support means disposed between said grinding means and feed means to support a portion of a tire feed therebetween, including the improvement of means for raising and lowering said support means to move it to an uppermost position and to a lowermost position from between said grinding and feeding means.

2. An apparatus for grinding tires and the like, comprising grinding means, means for feeding tires against said grinding means, including power roller means comprising a plurality of spaced apart rollers disposed in pairs in a direction converging toward said grinding means and carried by spaced apart frames, support means provided adjacent the converging end of said rollers to support a tire gripped therebetween, including the improvement of ram means for raising and lowering said support means to an uppermost position closest to said rollers.

3. The apparatus of claim 2 wherein said grinding means is an endless belt sander disposed adjacent a pair of rollers spaced closer together than some other of said pairs of rollers.

4. The apparatus of claim 3 wherein said belt sander and support means extend parallel with said rollers and substantially the full width of said rollers.

5. The apparatus of claim 3 wherein platen means are provided adjacent the belt sander when said power rollers feed a tire against it.

* * * * *